(12) United States Patent
Caillot et al.

(10) Patent No.: US 9,302,651 B2
(45) Date of Patent: Apr. 5, 2016

(54) SYSTEM AND METHOD OF REMOTE CLEANING OF A VEHICLE WINDSCREEN

(71) Applicant: Valeo Systèmes d'Essuyage, Le Mesnil Saint Denis (FR)

(72) Inventors: Gérald Caillot, Cernay la Ville (FR); Dominique Dias, St. Remy les Chevreuses (FR); Frédéric Giraud, Le Perray en Yvlines (FR); Izumi Sakai, Paris (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 160 days.

(21) Appl. No.: 13/912,597

(22) Filed: Jun. 7, 2013

(65) Prior Publication Data

US 2013/0327356 A1    Dec. 12, 2013

(30) Foreign Application Priority Data

Jun. 8, 2012   (FR) ...................................... 12 55367

(51) Int. Cl.
*B60S 1/08* (2006.01)
*B60S 1/48* (2006.01)

(52) U.S. Cl.
CPC ................. *B60S 1/08* (2013.01); *B60S 1/0896* (2013.01); *B60S 1/486* (2013.01)

(58) Field of Classification Search
CPC ........... B60S 1/08; B60S 1/0896; B60S 1/486
USPC .............................. 134/6; 15/250.31, 250.203
See application file for complete search history.

(56) References Cited

U.S. PATENT DOCUMENTS

| | | | | |
|---|---|---|---|---|
| 3,689,817 | A * | 9/1972 | Elliott | 318/443 |
| 6,763,546 | B1 * | 7/2004 | Smith | 15/250.04 |
| 7,748,075 | B2 * | 7/2010 | Nakano | 15/250.02 |
| 2004/0056620 | A1 * | 3/2004 | Takagi | 318/444 |
| 2006/0130877 | A1 * | 6/2006 | Huntzicker | 134/18 |
| 2006/0220598 | A1 | 10/2006 | Argo et al. | |
| 2009/0216402 | A1 * | 8/2009 | Kwon | 701/36 |

* cited by examiner

*Primary Examiner* — Douglas Lee
(74) *Attorney, Agent, or Firm* — Osha Liang LLP

(57) ABSTRACT

A method for cleaning a windscreen of a vehicle, in particular a motor vehicle, includes a phase of remotely activating a cycle of cleaning a windscreen of the vehicle, the cleaning cycle including at least one wiping phase with the aid of a wiping device of the vehicle.

11 Claims, 2 Drawing Sheets

SYSTEM AND METHOD OF REMOTE CLEANING OF A VEHICLE WINDSCREEN

The invention relates to a method for cleaning a windscreen of a vehicle, in particular a motor vehicle. It also relates to a control device configured to implement said method and an associated cleaning system and an associated remote control.

Motor vehicles are commonly equipped with a wiping device for wiping the windscreen and for avoiding any disruption to the view that the driver has of his surroundings. Such a device generally comprises two wiper blades which scrape the outer surface of the windscreen so as to remove water and soiling present on this surface from the field of vision of the driver.

It is also known to equip motor vehicles with a washing device which is designed to project a liquid onto the windscreen so as to make it easier to dissolve the soiling and thus increase the quality of windscreen cleaning. The most widespread washing devices comprise at least two separate nozzles installed on the bonnet of the vehicle, one of these nozzles being dedicated to spraying a region of the windscreen located facing the vehicle driver, while the other nozzle is designed to spray a region of the windscreen located facing the front passenger of the vehicle. Once a windscreen washing liquid has been projected onto the windscreen, wiping is activated.

US2006220598 discloses a remote control system for washing a windscreen of a vehicle, in particular a motor vehicle. Such a system makes it possible to benefit from washing liquid without the wiper blades being activated. It is thus possible to clean the windscreen manually. Although this document provides for remote transmission of an order for projection of the windscreen washing liquid, the system described is not configured to carry out cleaning without the involvement of an operator.

There is thus a need to clean a vehicle windscreen without it being necessary to manually wipe the latter before the vehicle is started.

The invention thus proposes a method for cleaning a windscreen of a vehicle, in particular a motor vehicle, the method comprising a phase of remote activation of a cycle of cleaning a windscreen of said vehicle, said cleaning cycle comprising at least one wiping phase with the aid of a wiping device of said vehicle.

The expression "remote activation" is understood to mean activation without acting on the conventional "under-steering wheel" controls of the vehicle. In other words, according to the invention, the cleaning cycle is activated without the driver necessarily being behind the steering wheel. In this way, it may be possible to remotely clean the windscreen before even entering the vehicle.

This being the case, said cleaning cycle may comprise a prior phase of washing the windscreen with the aid of a washing device of said vehicle.

In this regard, the applicant has been able to highlight the following difficulty. It is preferable for wiping to be effective in spite of the soiling present on the windscreen. However, it is known that the effectiveness of wiper blades is not optimal if dry soiling is present. In addition, the user may not be aware of the degree of soiling on the windscreen since he is activating the cleaning remotely. His vehicle may thus be out of view. One solution would be to systematically activate the washing device before the wiping device, but there is then the risk of the windscreen washing liquid being used unnecessarily.

In order to ensure effective cleaning in spite of these difficulties, it is proposed, according to a particularly advantageous embodiment of the invention, for said method to comprise a phase of testing for the presence of water and/or rain on the windscreen, said phase being intended to configure the windscreen cleaning cycle.

This arrangement results in the implementation of a windscreen cleaning cycle, taking account of an adequate state of degradation of solid impurities such as mud, droppings, insects that are present on the windscreen, and makes it possible to avoid overconsumption of the windscreen washing liquid.

A positive result of the testing phase may activate the windscreen wiping phase and/or a negative result of the testing phase may authorize the windscreen washing phase followed by a waiting phase before the windscreen wiping phase is activated. In this way, adequate degradation of the impurities present on the windscreen is ensured before wiping. The latter is thus facilitated and the service life of the scraper of the wiper blade is lengthened, since the latter does not encounter a solid body which may damage it. Another advantage of this embodiment is that a prior washing phase is systematically avoided when the latter is not necessary if the windscreen is already wet.

Said wiping phase comprises, for example, a phase of actuating blades of said wiping device.

Said washing phase comprises, for example, a phase of projecting a washing liquid onto the windscreen of the vehicle.

Said waiting phase makes use, for example, of a predetermined waiting time. Said predetermined time is, in particular, between a few seconds and a few minutes, for example 5 seconds to 2 minutes, and can vary depending on the washing liquid.

According to one feature of the invention, said washing liquid is heated during the washing phase. It is thus possible to strengthen its effectiveness.

It may also be possible to employ a washing liquid formulated such that the time for impregnation and dissolution of impurities or soiling on the windscreen, when the vehicle is stopped, is reduced. In other words, the washing liquid that is used during said washing phase may be different from a washing liquid that is used when the vehicle is running.

Said washing liquid that is used during said washing phase is, for example, enriched with formic acid, compared with the washing liquid that is used when the vehicle is running, this increasing the capacity of the washing product to dissolve insects that are stuck to the windscreen.

Said washing liquid that is used during said washing phase may also be enriched with surfactant products, compared with the washing liquid that is used when the vehicle is running, such that the dissolution of fatty bodies stuck to the windscreen is increased.

Said washing liquid that is used during said washing phase may also foam, such that a mechanical effect is added to the softening effect of the liquid.

It should also be noted that the invention also relates to a washing liquid comprising all or some of the abovementioned features.

According to yet another feature of the method in accordance with the invention, the projection pressure of the washing liquid during said washing phase, i.e. when the vehicle is at a stop, is lower than a projection pressure that is used during running, for example half or a quarter of the latter, such that the dispersal of the washing liquid over the windscreen is encouraged and the loss of product by excessively wide projection of the washing product onto the windscreen is reduced.

According to yet another feature of the invention, the wiping phase is carried out by a movement of the blades at a speed which is slower than a speed that is used when the vehicle is running, for example half or a quarter of the latter, in particular less than one wiping cycle per second, such that the friction of the viscous mixture of washing liquid and soiling with the wiper blade becomes more effective.

According to yet another feature of the invention, the movement of the blades may be jerky, at the highest possible angular frequency, for example less than 5°.

A back and forth movement of the blades, for example an advancement of 5° followed by a return of 3° is also conceivable.

In other words, the movement of the blades comprises advancing phases of the blades at a first angle, alternating with stopping phases and/or return phases at a second angle less than the first angle.

Furthermore, the windscreen cleaning cycle may be repeated a number of times to be determined depending on the wishes of the user or the programming of the vehicle.

The invention also relates to a control device installed on board said vehicle, said device being configured to implement the cleaning method described above.

Said control device comprises, for example, means for testing for the presence of water and/or rain on the windscreen and means for configuring a windscreen cleaning cycle.

Said means for testing for the presence of water and/or rain on the windscreen comprise, for example, a rain sensor for detecting rain or water or washing liquid on the windscreen.

Said means for configuring said windscreen cleaning cycle comprise material means or "hardware" and digital processing means or "software" suitable for carrying out said steps of the abovementioned method. Said material means and/or said digital processing means comprise, for example, an independent computer and/or are incorporated at least partially into a computer in the passenger compartment of the vehicle.

Said control device is advantageously able to be actuated by means of a remote control.

The invention furthermore also relates to an assembly of such a control device and said remote control and also to said remote control itself.

Said remote control is configured, for example, to output a signal for activating the cleaning cycle. It is, in particular, a mobile telephone, an infrared remote control and/or a remote control that uses a communication mode such as the ones known under the names Wi-Fi, Bluetooth, ZigBee.

In this respect, said means for configuring said windscreen cleaning cycle advantageously comprise corresponding receiving and/or integrating means for said signal for activating the cleaning cycle, for example a telematics computer, a simple radio receiver, infrared receiver, or the like.

They may also comprise a device for outputting said signal for activating the cleaning cycle, for example an electronic communications network of the vehicle (LIN, CAN, MOST, FlexRay or the like).

Said control device may likewise comprise a battery charge level sensor which is able to check whether the energy supply of the system for carrying out said cleaning cycle is adequate.

This being the case, the invention also relates to a computer program which is savable in a memory of said remote control, said program comprising instructions for implementing the remote activation phase of the above-described cleaning method when the program is run on a processor. It may thus be a digital application loaded on the telephone that acts as the remote control.

The invention likewise relates to a windscreen cleaning system comprising said control device, said cleaning system comprising a windscreen washing device and a windscreen wiping device.

The windscreen wiping device may comprise at least one blade that has an installed washing device, this encouraging the dispersal of the washing liquid over the windscreen.

The system advantageously comprises two washing liquid tanks, a first tank for washing the windscreen during running and a second tank for said cleaning of the windscreen according to the abovementioned method, the washing liquid in the second tank being adapted accordingly.

The invention is illustrated below with the aid of an embodiment of the invention and with reference to the appended drawings, in which.

Figure 1:
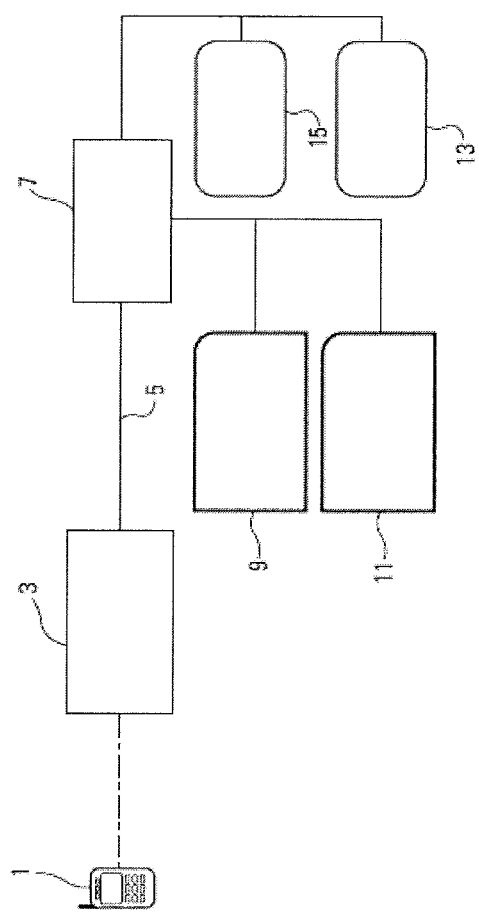
FIG. 1 is a block diagram of a vehicle windscreen cleaning system according to one embodiment of the invention.

As illustrated in FIG. 1, the system shown communicates with a control means for remotely activating a cleaning cycle for the windscreen of a vehicle, for example a mobile telephone 1 onto which an application configured for outputting a corresponding hyperfrequency signal has been loaded.

More generally, it may be any mobile telephone that outputs a signal that can be recognized by an on-board computer. Said telephone may incorporate a medium that is readable by a microprocessor of said telephone, said medium storing instructions that can be executed by said microprocessor and allowing the output of said signal, or the reception of information in return.

Said system comprises, for example, a means for receiving the signal output by the mobile telephone, such as a telematics ECU device 3 with an antenna of the vehicle, a device for transmitting a signal output by the telematics ECU device for activating a windscreen cleaning cycle, such as an electronic communication network 5 of the vehicle, for example of the LIN, CAN, MOST, FlexRay type or the like, a wiping system computer, known as wiping ECU 7, which is in this case an ECU device dedicated to the wiping of the vehicle windscreen, a rain sensor 9 disposed on the windscreen, a battery charge level sensor 11 that checks that the energy supply of the system for carrying out said cleaning cycle is adequate. An on-board control device is thus formed.

Said system also comprises, in particular, a windscreen washing device comprising at least one jar of windscreen washing liquid (not shown), a windscreen washing liquid pump 13 and means for projecting said liquid (not shown) and a device for wiping the windscreen which is provided with one or more wiper blades (not shown) that are actuated by one or more wiper motors 15 by way of arms and gearing (not shown) connecting said arms and said motors 15.

The wiping ECU 7 is connected to the rain sensor 9 and to the battery charge level sensor 11, receiving the respective signals relating to rain level and battery charge, and to the wiper motor(s) 15 and to the windscreen washing liquid pump 13 in order to activate these elements. It functions depending on the cycle activated by the remote control means, as will be explained in more detail below, and/or depending on a cycle activated, conventionally, by under-steering wheel control means.

It should be noted that this wiping ECU 7 may also be connected to a device for heating the washing liquid which is for example disposed in the region of the nozzles or else on the washing liquid jar, and possibly to a three-way valve or multi-way valve which is itself connected to two separate windscreen washing liquid tanks for controlling the projection of a windscreen washing liquid suitable for cleaning the windscreen, depending on whether the vehicle is running or whether the cleaning cycle is activated remotely.

Figure 2:
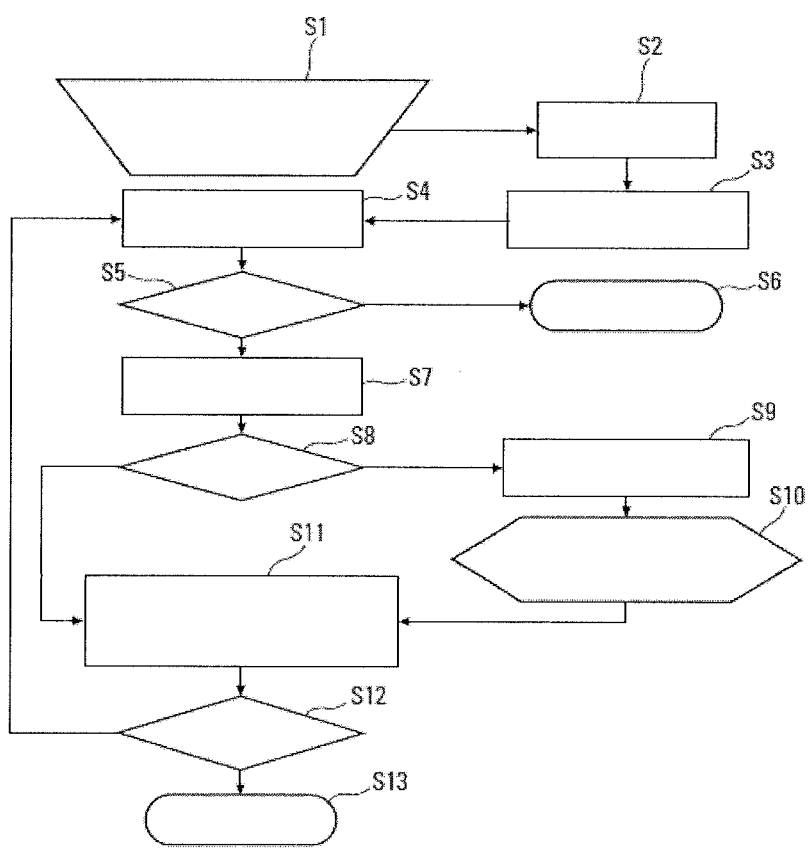
FIG. 2 is a flowchart illustrating a cleaning cycle of the system in FIG. 1.

The way in which the system functions is described below in relation to the steps of the method as they appear in the flow chart in FIG. 2.

In a typical case of the invention, it is presumed that the motorist wishes to access his vehicle in order to use it while being certain that the windscreen is clean for the starting of the vehicle.

It should be recalled that, within the meaning of the invention, it is a matter of carrying out the activation of a cycle of cleaning the windscreen of the vehicle, in particular of evaluating if a washing phase is necessary.

In step S1, the user sends a cleaning control signal via his mobile telephone 1 to the vehicle, which receives it via the telematics ECU (step S2) and transmits it to the wiping ECU in step S3.

The wiping ECU then interrogates the battery level sensor in step S4. In the following step S5, if the battery is sufficiently charged, the cycle may continue, but otherwise it is interrupted in step S6 and the user is informed of this.

Next, the wiping ECU interrogates the rain sensor in step S7. In the following step S8, if there is no rain, the wiping ECU triggers the windscreen washing liquid pump in step S9 in order to spray the windscreen with windscreen washing product, at a low driving speed, so as to output a liquid projection pressure which is reduced (for example half) compared with the conventional projection pressure of windscreen washing liquid that is used when the vehicle is running, and to realize good dispersal of the windscreen washing liquid over the windscreen.

A following step S10 consists in waiting for the impurities to be impregnated with washing liquid before starting the wiping motor in step S11, for example 30 seconds.

The blades are then moved over the windscreen in order to remove the impurities dissolved in viscous product. This movement, which may cover the entire windscreen, takes place by way of a developed movement compared with usual wiping.

It is known that, on the one hand, static friction is almost always superior to dynamic friction, and, on the other hand, that dynamic friction drops with speed in the case of viscous friction, which is the case here on account of the windscreen washing liquid. Thus, maximum friction between the wiping system, specifically in this case the rubber surface of the blade, and the impurities is sought. It is thus quite advantageous to move the blades very slowly over the surface of the impurities, for example at less than 1 wiping cycle per second. In order to avoid any doubt, a wiping cycle is the name given here to a complete angular movement of the blade starting from a rest position to a maximum angular position of travel, completed by the return movement into its rest position.

During said wiping cycle, the blades may stop in order to restart, specifically at the highest possible angular frequency, for example at less than 5° per movement. A back and forth movement of low amplitude is also conceivable, for example an advancement of 5° followed by a return of 3° per movement.

Furthermore, this complete cycle may repeat N times (step S12), repeating from step S4, N being determined depending on the wishes of the user or the programming of the vehicle. At the end of the N times, the process is terminated in step S13.

Alternatively, it is also conceivable for the rain sensor 9 to wake up once a day when the vehicle is stopped. If, at this precise moment, it detects water, then it is possible to benefit from this opportunity to carry out wiping at a very slow speed.

The means for projecting the washing liquid comprise, for example, two separate nozzles connected to the windscreen washing liquid pump. Alternatively, they may be incorporated into the wiping device, the latter comprising a spraying system installed in an arm or a blade, thereby further improving the dispersal of the washing liquid over the windscreen.

The system will advantageously be equipped with electric motor(s), making it possible to very easily control their speed, when they stop and when they restart.

The system may be refined by taking into account the level of the windscreen washing liquid, so that it is always left, for example, at 25%. For this purpose, use is made of information relating to the level of windscreen washing liquid, this being made available on the electronic network of the vehicle.

The invention claimed is:

1. A method for cleaning a windscreen of a motor vehicle, the method comprising:
a phase of remote activation of a cycle of cleaning a windscreen of said vehicle, said cleaning cycle comprising at least one wiping phase with the aid of a wiping device of said vehicle; and
a testing phase of testing for the presence of water and/or rain on the windscreen, wherein the testing phase configures the windscreen cleaning cycle, and
wherein a positive result of the testing phase activates the windscreen wiping phase and a negative result of the testing phase authorizes a windscreen washing phase followed by a waiting phase before the windscreen wiping phase is activated, and
said wiping phase comprises a phase of actuating blades of said wiping device,
said washing phase comprises a phase of projecting a washing liquid onto the windscreen of the vehicle, and
said waiting phase makes use of a predetermined waiting time.

2. The method according to claim 1, in which said cycle comprises a prior phase of washing the windscreen with the aid of a washing device of said vehicle.

3. The method according to claim 1, in which the wiping phase is carried out by a movement of the blades at a speed of less than one wiping cycle per second.

4. The method according to claim 1, wherein the wiping phase comprises advancing phases of the blades at a first angle, alternating with stopping phases and/or return phases at a second angle less than the first angle.

5. A control device installed on board said vehicle, said device being configured to implement the cleaning method according to claim 1.

6. The control device according to claim 5, comprising means for testing for the presence of water and/or rain on the windscreen and means for configuring the windscreen cleaning cycle.

7. The control device according to claim 5, wherein the control device is actuated by a remote control.

8. An assembly of a control device according to claim 7 and said remote control.

9. A windscreen cleaning system comprising a control device according to claim 5.

10. The cleaning system according to claim 9, comprising a cleaning device and a washing device.

11. A remote control for actuating a control device installed on board a motor vehicle, the control device being configured to implement the cleaning method of claim 1 for cleaning a windscreen of the motor vehicle the remote control comprising:

a computer program stored in a memory of said remote control, said program comprising instructions for implementing a remote activation phase of said cleaning method when the program is run on a processor, wherein the remote activation phase comprises a cycle of cleaning the windscreen of said vehicle, the cycle having at least one wiping phase with the aid of a wiping device of said vehicle, wherein a testing phase of testing for the presence of water and/or rain on the windscreen configures the cycle of cleaning, and wherein a positive result of the testing phase activates the windscreen wiping phase and a negative result of the testing phase authorizes a windscreen washing phase followed by a waiting phase before the windscreen wiping phase is activated.

\* \* \* \* \*